United States Patent
Hennessy et al.

(10) Patent No.: US 7,619,325 B1
(45) Date of Patent: Nov. 17, 2009

(54) RING CONFIGURATION FOR COMPACT POWER SUPPLY OF POWER ELECTRONICS

(76) Inventors: Michael J. Hennessy, 9 Patroon Pl., Ballston Lake, NY (US) 12019; Otward M. Mueller, 96 Sweet Rd., Ballston Lake, NY (US) 12019; Eduard K. Mueller, 20 McCormicks La., Ballston Lake, NY (US) 12019; John N. Park, 723 Grooms Rd., Rexford, NY (US) 12148

( * ) Notice: Subject to any disclaimer, the term of this patent is extended or adjusted under 35 U.S.C. 154(b) by 505 days.

(21) Appl. No.: 11/224,183

(22) Filed: Sep. 12, 2005

Related U.S. Application Data

(60) Provisional application No. 60/609,149, filed on Sep. 11, 2004.

(51) Int. Cl.
*H01B 7/30* (2006.01)
(52) U.S. Cl. .................................. 307/147; 439/112
(58) Field of Classification Search ............... 363/14, 363/17, 132; 307/147; 361/611, 729, 735, 361/601, 624, 728, 830; 439/76.2, 112; 310/71
See application file for complete search history.

(56) References Cited

U.S. PATENT DOCUMENTS

| | | | | | |
|---|---|---|---|---|---|
| 1,912,918 | A | * | 6/1933 | Rossman | 307/147 |
| 2,008,109 | A | * | 7/1935 | Reher | 174/129 R |
| 3,903,442 | A | * | 9/1975 | Krulls | 310/229 |
| 4,079,305 | A | * | 3/1978 | Peterson et al. | 363/27 |
| 4,683,527 | A | * | 7/1987 | Rosa | 363/5 |
| 6,894,411 | B2 | * | 5/2005 | Schmid et al. | 310/71 |
| 2007/0004249 | A1 | * | 1/2007 | Uchiyama et al. | 439/76.2 |

* cited by examiner

*Primary Examiner*—Albert W Paladini
*Assistant Examiner*—Daniel Cavallari
(74) *Attorney, Agent, or Firm*—Leonard Cooper

(57) ABSTRACT

An ultra compact ring topology puts the output terminals of solid state switches physically at the center of a circuit with the switches surrounded by voltage busses. The switches are symmetrically arranged around the output bus, the voltage busses are filtered (decoupled) to ground using symmetrically positioned filter components, and lead lengths to and from the switches are minimized. Switch driver circuits are closely integrated with each switch and positioned as close as possible, each to its associated switch, and arranged symmetrically. Switches may be at cryogenic temperatures and busses and lead connectors may be superconductive.

19 Claims, 10 Drawing Sheets

Basic Ring Network

Basic Ring Network

Stacked Switch Ring Network

Alternating Half Bridge
Ring Network

Stacked Half Bridge Ring Networks

Multiphase Output from Three Half Bridge Ring Networks

RING CONFIGURATION FOR COMPACT POWER SUPPLY OF POWER ELECTRONICS

This patent application claims the benefit of provisional patent application 60/609,149, filed Sep. 11, 2004.

BACKGROUND OF THE INVENTION

In the realm of power electronics, many topologies require symmetric and anti-symmetric switches as building blocks for motor controllers, inverters, converters, etc., some of which are shown schematically in FIGS. 1A-1D. By switches is meant electrically controlled switches such as solid state switches, i.e., transistors, MOSFETs, IGBTs, etc., or other devices on the developmental horizon. A key factor that adversely affects performance is the residual (parasitic) inductance in the loop between the voltage bus and the output bus. This residual inductance can cause instabilities and oscillations (ringing), particularly at high switching speeds.

SUMMARY OF THE INVENTION

To address the issue of residual inductance, the present invention provides an ultra compact ring topology, which puts the output terminals of the switches physically at the center of the circuit with the switches surrounded by the voltage busses. The switches are symmetrically arranged around the output bus, the voltage busses are filtered (decoupled) to ground using symmetrically positioned filter components, and the lead lengths to and from the switches are minimized. For best performance the switch driver circuits are closely (physically) integrated with each switch. For simplicity in the figures, the driver circuits are not shown, but they are positioned as close as possible each to its associated switch and arranged symmetrically. "Symmetrically" does not imply laser precision in measurement of angles by degrees, minutes, and seconds of angles, etc. A "central" conductor need not be precisely at the center of surrounding rings. Actually implied is an engineering symmetry with practical allowances for component placement.

Several examples of this basic concept are described below with reference to the figures:

A basic ring network 10 is shown in FIG. 2. Each switch S1-S8 is connected radially to a central output post or bus 12 in the same plane 14. Switches S1-S8 are arranged in symmetric patterns around the output post/bus 12 so that each switch is equivalent and performs substantially identically. This requires that each switch is closely matched (again in an engineering sense) in individual performance characteristics. Some devices such as MOSFETS current share when in parallel and do not require the same degree of matching as other devices.

Each switch S1-S8 is fed from a common electrically continuous surrounding voltage ring or bus 16. The surrounding voltage bus 16 is filtered (decoupled) via capacitors C1-C16 to a continuous ground ring 18, usually at DC ground, or in an alternative assembly (not shown) to a virtual ground ring. (The virtual ground is not necessarily at DC ground potential but is a good AC ground. The virtual ground may be another bus at a fixed voltage.) The surrounding voltage ring 16 is electrically connected to one (or several) vertical post 20. The surrounding ground (or virtual ground) ring 18 is tied to one (or several) vertical post 22. The decoupling capacitors C1-C16 are arranged in a symmetric fashion around the output post 12.

Each switch may or may not include a driver and isolator (not shown). Switch drivers are positioned very close to the switch and also arranged in a symmetric fashion about the post 12. Each switch driver or gate is driven by a common surrounding bus or wiring, preferably shielded (not shown). Switch gates or drivers are fed by transmission lines or circuits which equalize the timing delay when switches are simultaneously actuated, leading to minimal skewing of the timing for actuation. One example of a network to actuate switches S1-S8 is a small signal ring bus with radial leads connected symmetrically to each switch (not shown).

Switches S1-S8 include, but are not limited to: MOSFETs, IGBTs, IGCTs, ETOs, thyristors (GTOs . . . ), bipolar transistors, diodes, etc.

A stacked switch ring network 30 is shown in FIG. 3, where switches S and capacitors C are omitted only to simplify the drawing. Several ring networks 10 (as in FIG. 2) are electrically connected in a stack to common vertical busses/posts. Each ring network 10 is connected to a common output bus 12. Vertical busses 20, 22 respectively feed voltage rings 16 and ground rings 18. (It is best to arrange the vertical busses symmetrically around the output bus 12 if more than one vertical bus is used for ground 22 and voltage 20.) Each network 10 is constructed with its components and connectors as if aligned to or incorporating an imaginary plane (not shown). In stacking the networks 10, the planes are parallel to each other.

An alternating half bridge ring network 40 is shown in FIG. 4 where switches S and capacitors C are omitted only to simplify the drawing. Alternating high side ring networks 10' and low side ring networks 10" are electrically connected in a stack to vertical busses/posts. The ring networks are substantially the same as in FIG. 2 except for their alternate connections to the input voltage signals.

High side ring network 10' is connected to positive voltage bus 20'. Low side ring network 10" is connected to negative voltage bus 20". V+ bus 20' connects 16' to all high side ring networks 10'. V− bus 20" connects 16" to all low side ring networks 10". For optimum performance and minimum circuit inductance, high and low side ring networks 10', 10" are on circuit boards (not shown) stacked as close together as possible.

An half bridge ring network 50 containing high/low switches S1-8 as shown in FIG. 5 is similar to ring network 10 in FIG. 2 except each switch module in FIG. 5 contains a high and low side switch pair. The high side is connected to the V+ ring 116'. The low side is connected to the V− ring 116". The decoupling capacitors C1-C16 are symmetrically arranged about output post 12, thus combining the features of 10' and 10" between V+ and V−. In an alternative arrangement (not shown) capacitors are placed from V+ to ground and from V− to ground. The grounds are nearby ground rings. The V+ ring 116' and V− ring 116" are physically in one plane, or alternatively in two planes adjacent each other. In either case the connections are as illustrated in FIG. 5. This circuit may be integrated in a three dimensional structure, similar to the embodiment shown in FIG. 9.

Half bridge ring networks 60 in geometric sectors, as in FIG. 6, are similar to FIG. 4 except there are alternations of high/low switch connections around the coplanar sectors of the ring in FIG. 6. On the other hand, in FIG. 4, the high/low rings are alternated in a stack of rings.

Note: Similar topology for sectors can be developed. The voltage busses 20' and 20" are connected together on the top or bottom to their respective common voltage feeds.

Stacked half bridge networks 70 are shown in FIG. 7 and include the ring networks 60 of FIG. 6. Note: a ground ring or several ground rings can be added near V+ and V− for decoupling and shielding.

Multiple half bridges 80 may be combined by using rings 60', 60", 60''' as in FIGS. 6, 7, but with coaxial center post tubes 12,112, 212 as shown in FIG. 8. These rings can be 3 phase full bridges or other multiphase full bridges (not shown).

In the housing 90, FIG. 9, a vented grounded cylinder or screen 91 surrounds the circuits 80 (as shown in FIG. 8) to reduce EMI and RFI electrical noise, and allows coolant flow. The screen 91 also serves as a safety cover at ground potential. All busses (outputs, V+, V−, ground) interface with external power sources through a coaxial lead 92. In three phase systems output comes out on a triax or quadax lead. There is room for electrical filter networks on ground plates 93 on the top and bottom of the assembly 80 within the ground screen 91.

BRIEF DESCRIPTION OF THE DRAWINGS

FIG. 1A (left) shows a rectifier. FIG. 1B (right) illustrates a single switch. FIG. 1C (left) shows a half bridge, and FIG. 1D (right) shows a full bridge;

In FIGS. 3-9, black dots are used to indicate some of the electrical connections where otherwise ambiguity might exist regarding connections, as will be apparent to those skilled in the art.

DESCRIPTION OF PREFERRED EMBODIMENTS

Figure 1A:
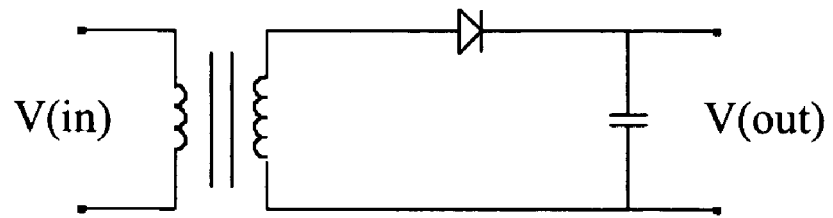
FIGS. 1A-D are electrical schematics showing typical power electronics topologies, which may be building blocks of large power systems.
Figure 1A:
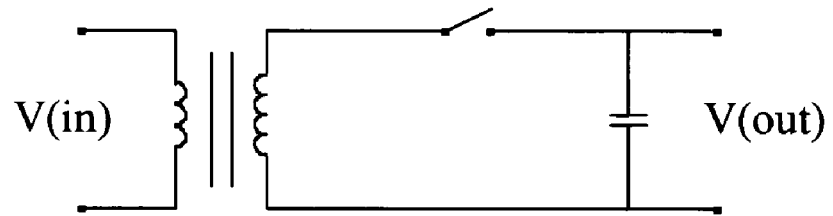
Figure 1B:
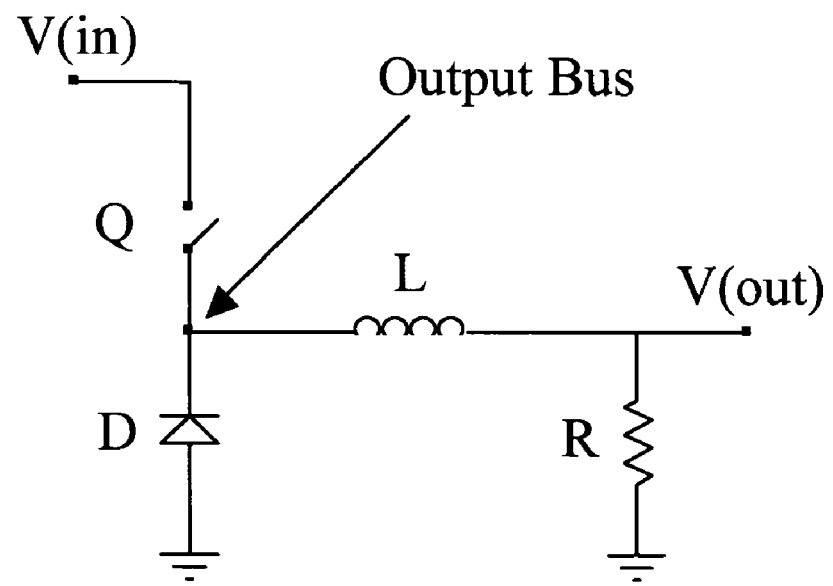
Figure 1C:
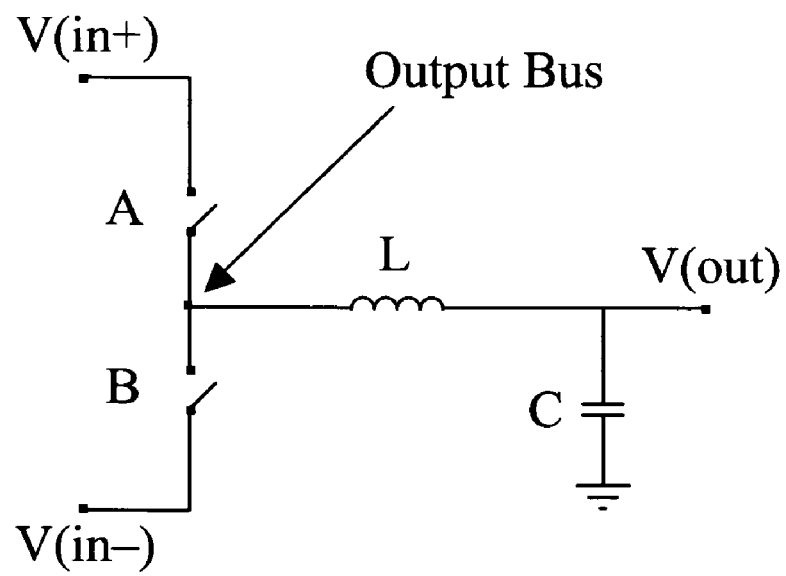
Figure 1D:
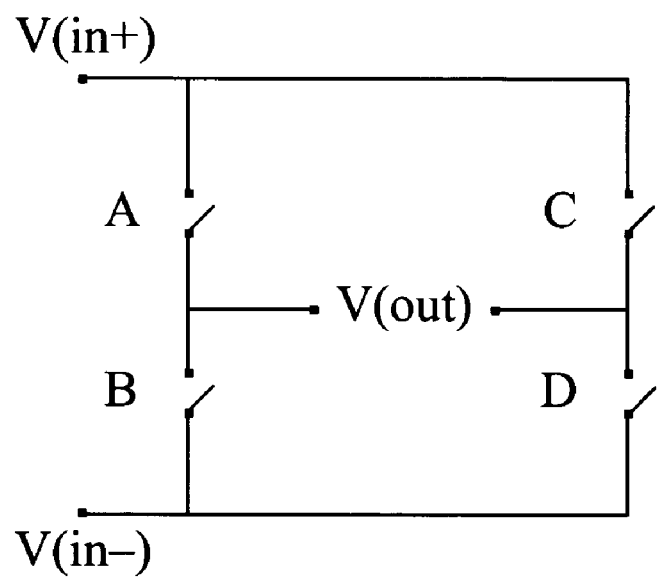

There are several preferred embodiments for this invention. All share in common a circular arrangement of power devices (MOSFETs, IGBTs, etc.) around a central output post.

In general, similar power switches (e.g. FIG. 2) are arranged in symmetric patterns (like radial spokes) around the output post bus 12 so that each switch is equivalent and performs identically. This requires that each switch in a symmetric pattern is closely matched to the others in performance. Switches are supplied with voltage from a surrounding voltage ring 16, which is concentric with the output bus 12 and filtered (decoupled) via capacitors placed between the voltage ring 16 and a ground ring 18 (or virtual ground ring). The virtual ground (not shown) is not necessarily at DC ground potential but is a good AC ground. It could be another bus at a fixed voltage.

The surrounding voltage ring 16 is an electrically conductive ring tied to one (or several) electrically conductive vertical posts 20 for connection to other circuits or to the power supply. The surrounding ground (or virtual ground) is an electrically conductive ring 18 tied to one (or several) vertical posts 22 for connection to other circuits or to the power supply. The decoupling capacitors C1-C16 are arranged as though along radial spokes in a symmetric fashion around the output post 12. Each switch may or may not include a driver and isolator (not shown). Each switch driver is positioned very close to the associated switch and also arranged in a symmetric fashion about the central post 12. Each switch driver or gate is driven by a surrounding bus or wiring (not shown), preferably shielded, and is fed by transmission lines or circuits (not shown), which equalize the timing delay when the switches are simultaneously actuated, leading to minimal skewing of the timing for actuation. One example (not shown) is a small signal ring bus with radial leads connected symmetrically to each switch. Power switches that can be utilized include, but are not limited to MOSFETs, IGBTs, IGCTs, ETOs, Thyristors (SCRs, GTOs, MTOs, etc.), bipolar transistors, and diodes. Any kind of electronic switch can be used.

Figure 3:
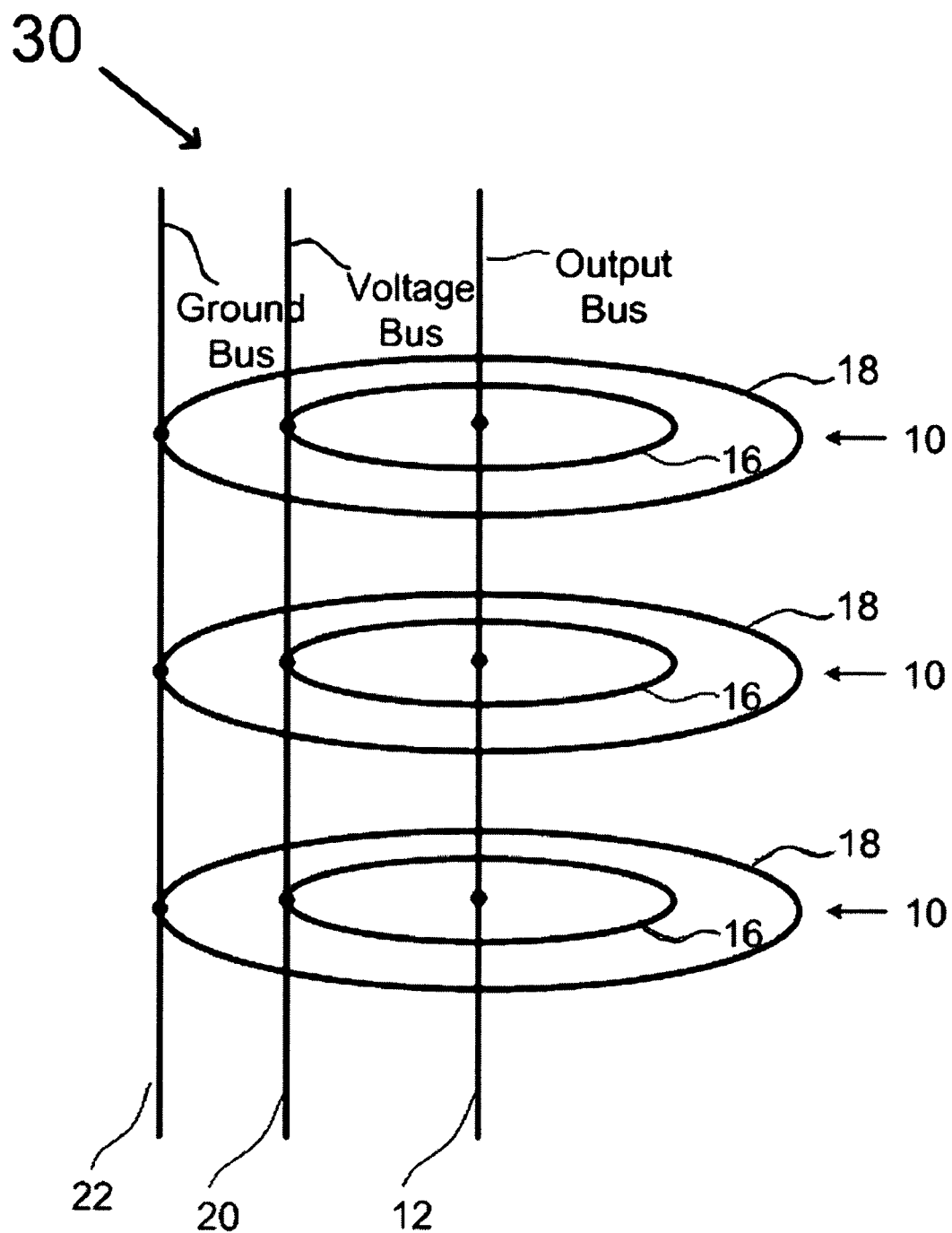
FIG. 3 is a schematic of stacked switch ring networks of FIG. 2, several ring networks placed on top of each other.

In a specific embodiment (e.g. FIG. 3), several ring boards are stacked to form a three-dimensional ring network 30. Here, ring networks 10 are electrically connected to vertical busses and posts 20, 22. Each ring network 10 is connected to a common output bus 12. Vertical busses 20 and 22 feed voltage rings and ground rings, respectively. It is desirable to arrange the busses and rings symmetrically.

In another embodiment 40 (FIG. 4), stacked boards comprise alternating half bridge ring networks. High-side ring networks 10' alternate with low-side ring networks 10". Each high-side ring network 10' is connected to a positive voltage bus 20', and each low-side ring network 10" is connected to a negative voltage bus 20". The V+ bus 20' connects to all high side ring networks 16'. The V− bus 20" connects to all low side ring networks 16". For optimum performance and minimum circuit inductance, high- and low-side ring networks are on circuit boards mounted (stacked) as close together as possible.

Half bridge ring networks 50 (FIG. 5) contain high/low switches on the same board. This is electrically similar to the previous embodiment (FIG. 4) except that each switch module contains a high side and low side switch pair, and the high- and low-side switches are positioned on the same plane rather than spaced by stacking, usually vertically. Again, each high side is connected to the V+ ring, and each low side is connected to the V− ring. The decoupling capacitors C1-C16 are symmetrically arranged around an output post 12, combining the electrical features of 10' and 10" between V+ and V−. Additional capacitors (not shown) may be placed from V+ to ground and V− to ground. These grounds would physically be nearby ground rings.

Figure 9:
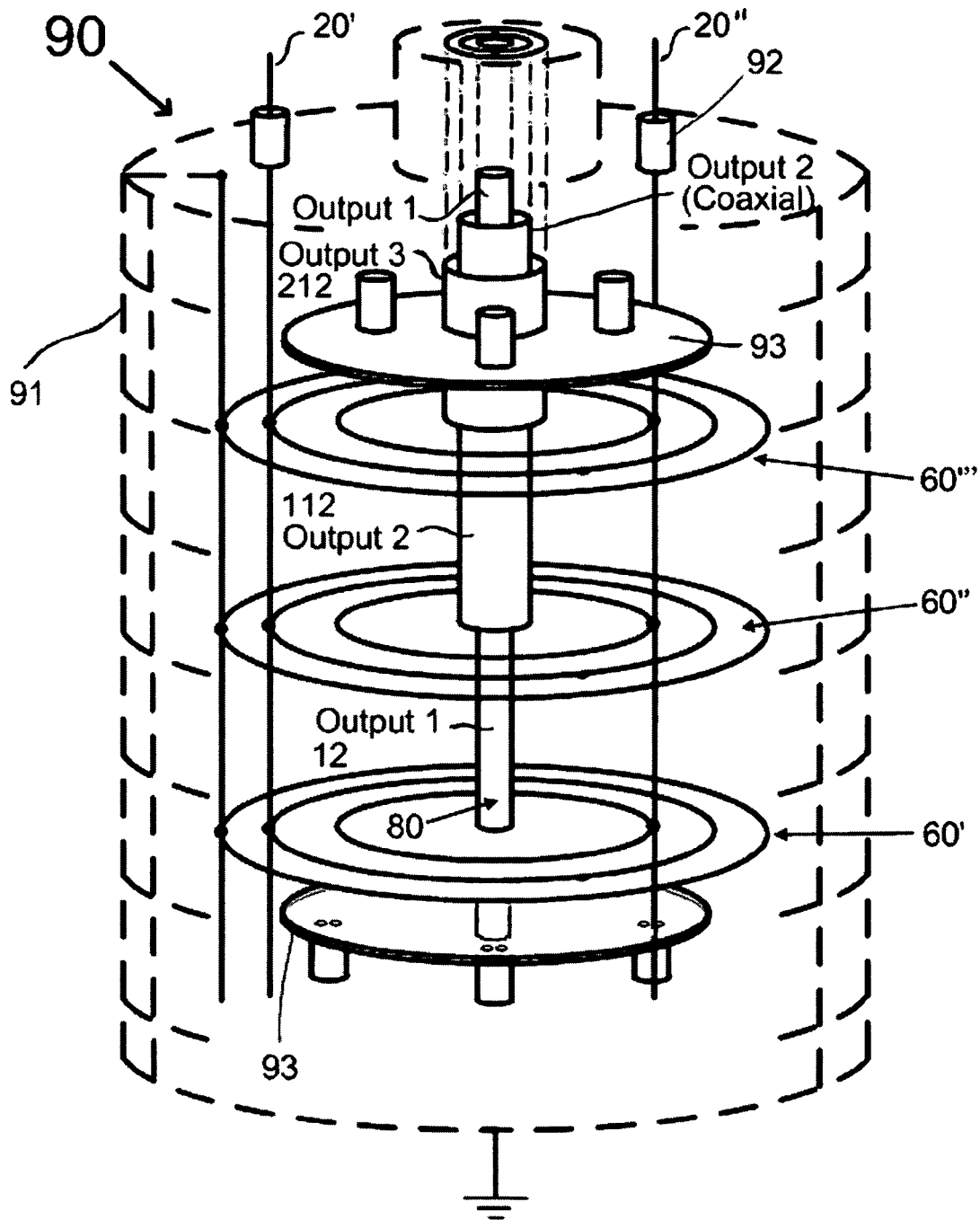
FIG. 9 is a schematic of a housing assembly usable with the compact power electronics packages described in FIGS. 2 through 8.

The V+ring and V− ring may be physically in one plane or in two planes, one adjacent the other. This assembly can be integrated in a three dimensional structure, similar to the embodiment shown in FIG. 9. The half-bridge modules (high and low switch pairs) can also be separated into individual high- and low-side modules, which are separated into different geometric sectors of the circular structure, but are nonetheless placed on the same plane. Sectors can also be used in other topologies described above. The voltage busses 20' and 20" are connected together at either end of the assembly to their respective common voltage feeds.

Figure 4:
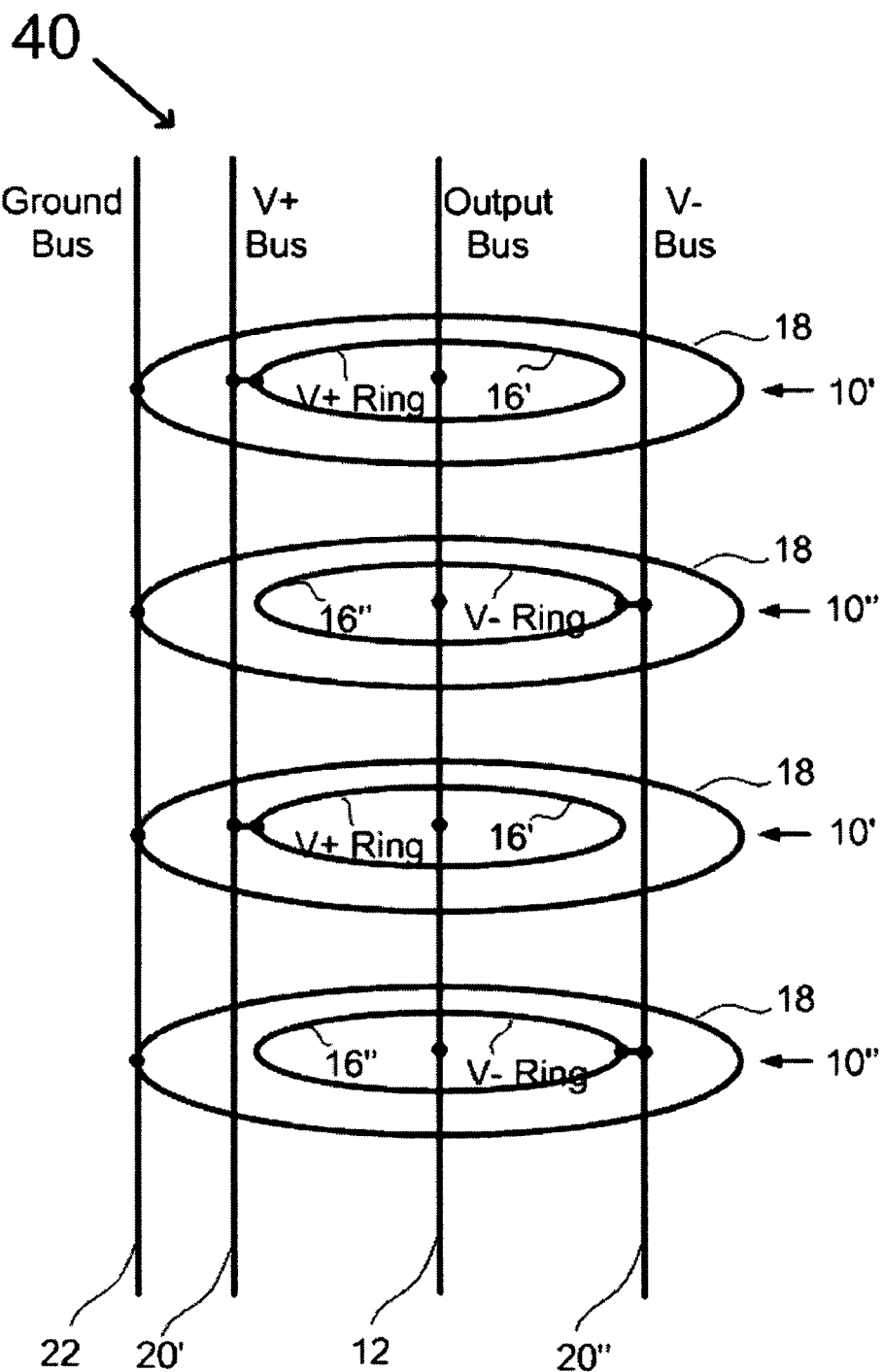
FIG. 4 is a schematic of alternating half bridge ring networks.
Figure 5:
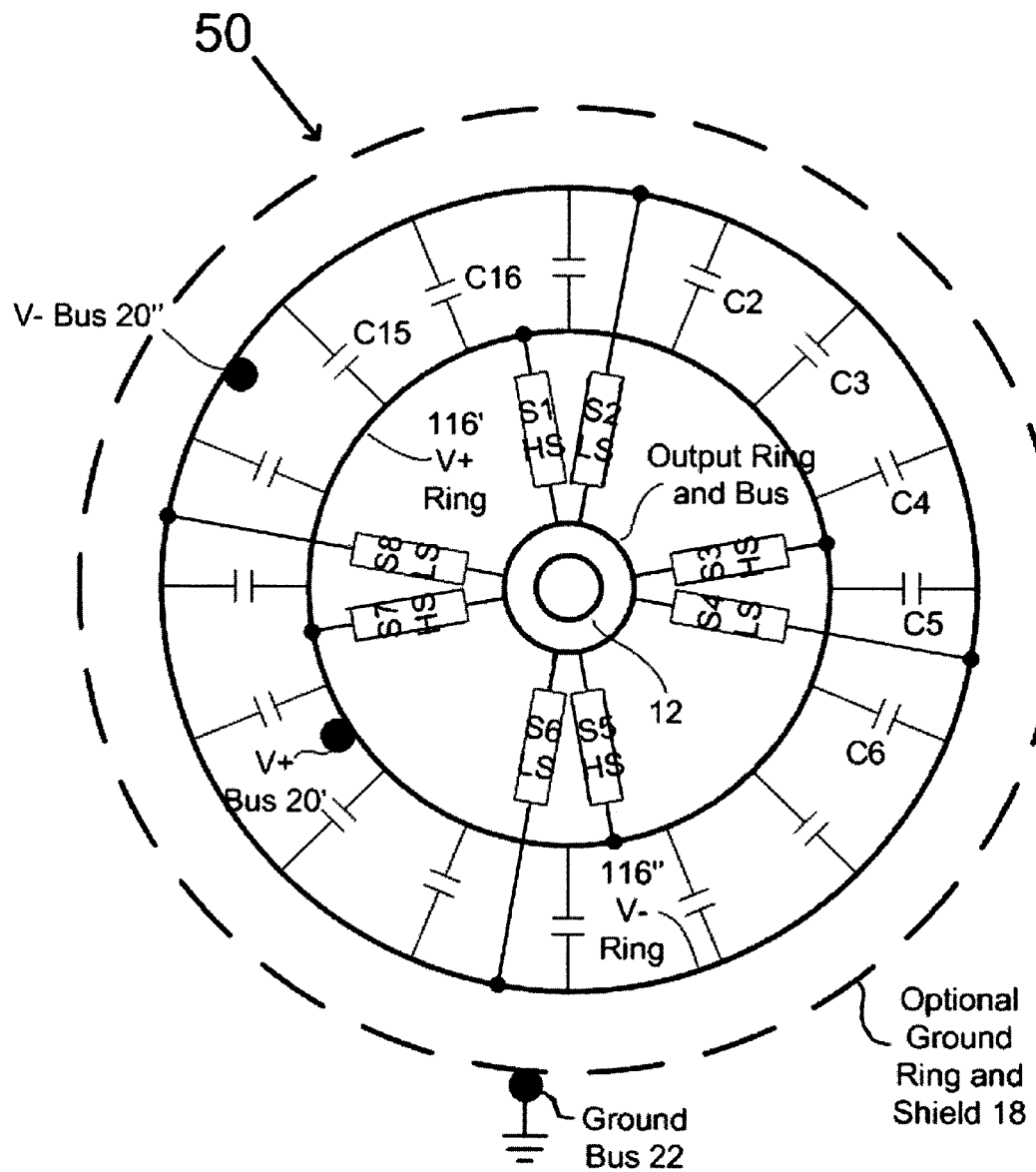
FIG. 5 is an electrical schematic of half bridge ring networks containing high-side and low-side switches; (this is similar to FIG. 2 except in FIG. 5 each switch module contains a high- and low-side switch pair.)
Figure 6:
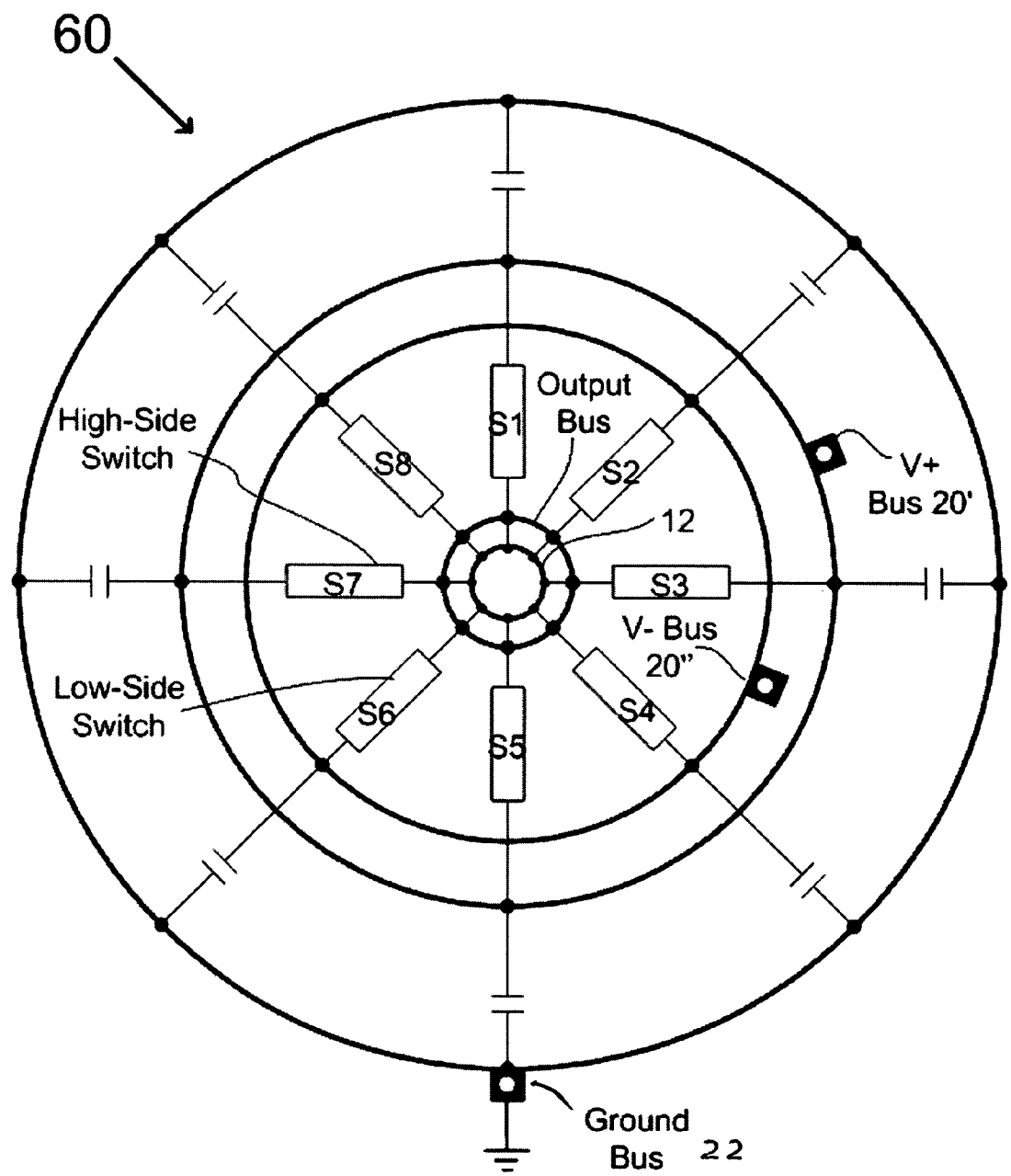
FIG. 6 is an electrical schematic of half bridge ring networks distributed into alternating ring sectors.

Half bridge ring networks 60 in geometric sectors, as in FIG. 6, are similar to FIG. 4 except there are alternations of high/low switch connections around the coplanar sectors of the ring in FIG. 6. On the other hand, in FIG. 4, the high/low rings are alternated in a stack of rings.

Note: Similar topology for sectors can be developed. The voltage busses 20' and 20" are connected together on the top or bottom of the stack to their respective common voltage feeds.

Figure 7:
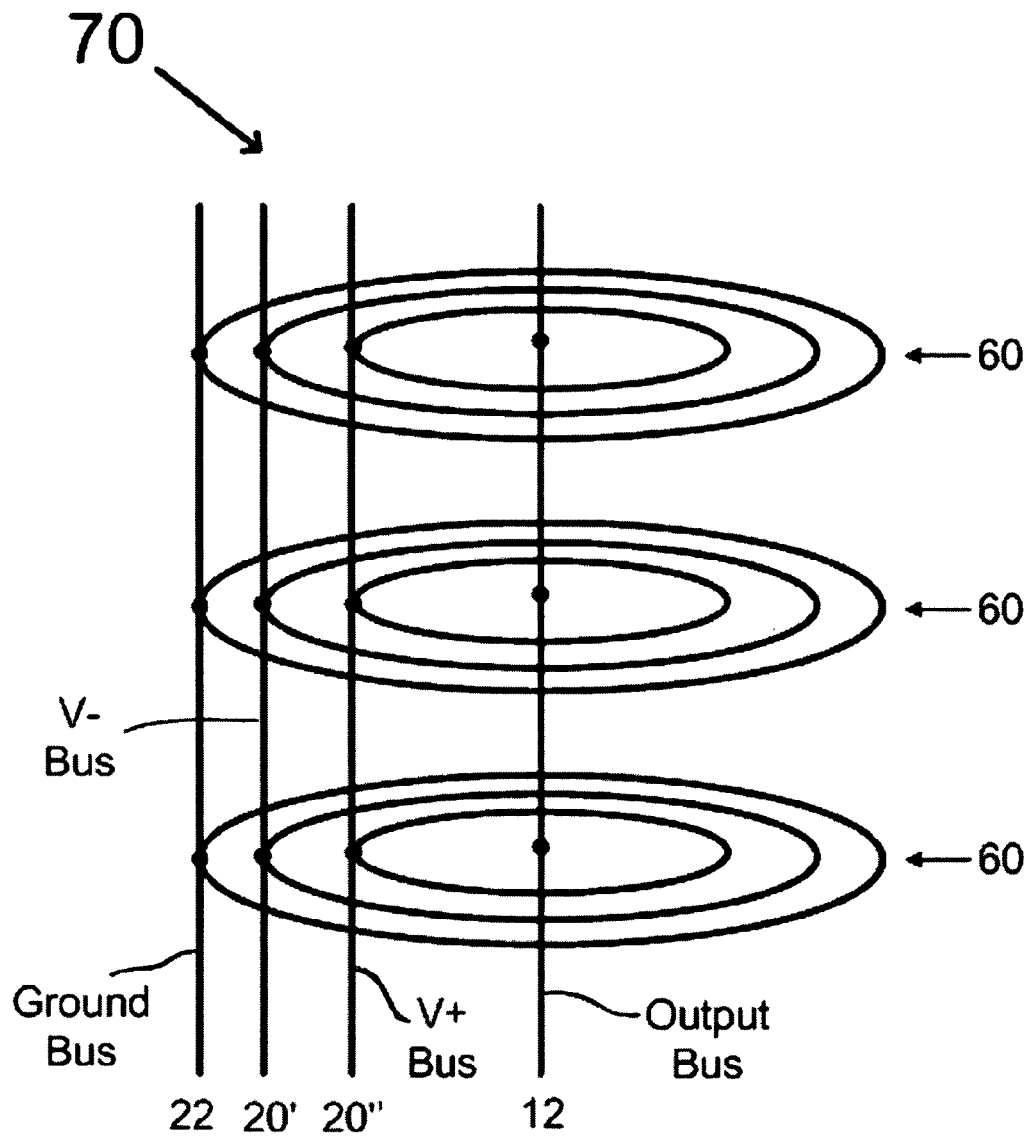
FIG. 7 is a schematic of stacked half bridge networks of FIG. 6.
Figure 8:
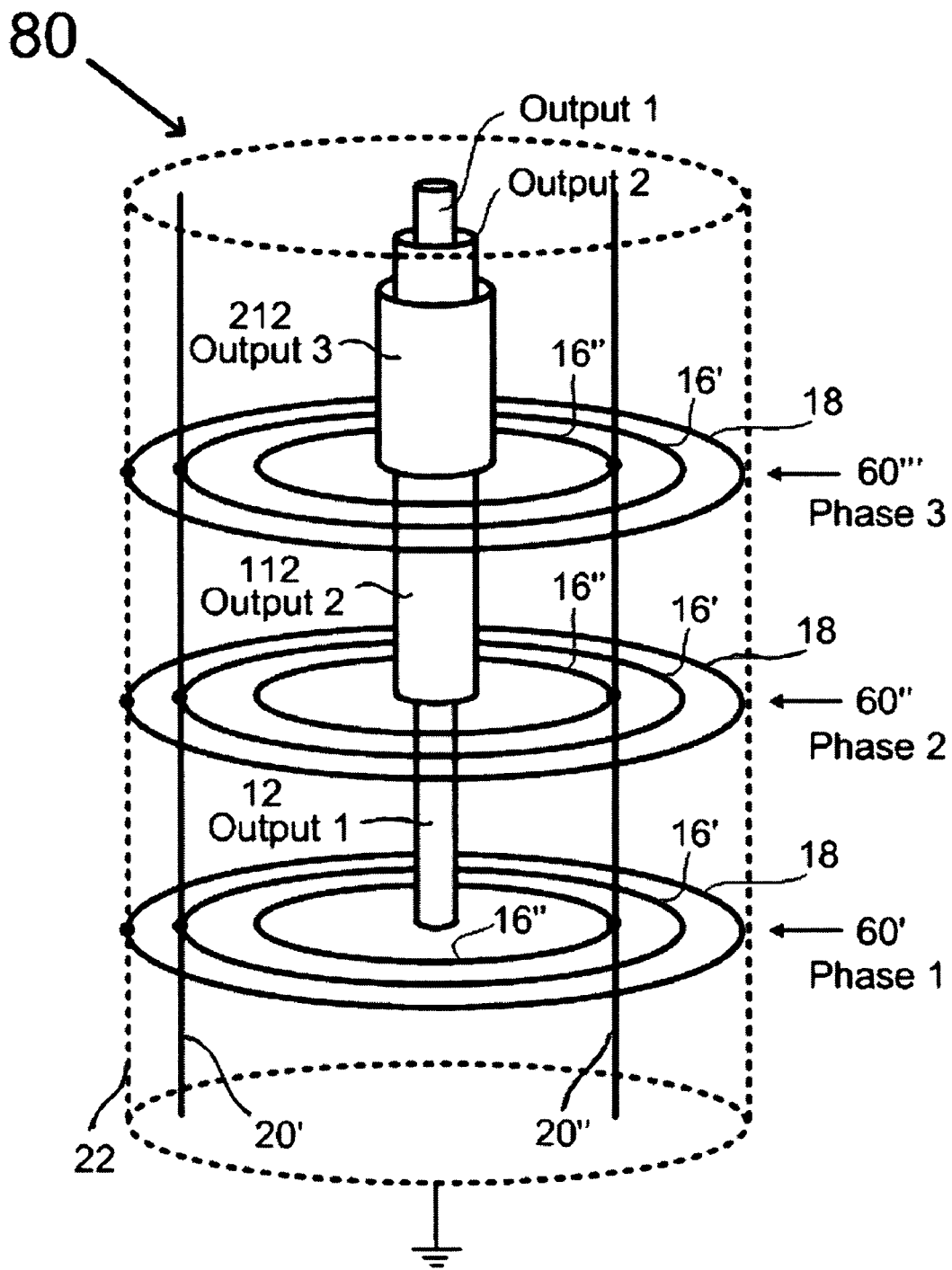
FIG. 8 is a schematic of multiple half bridges combined by using coaxial center post tubes; (these bridges can be three-phase full bridges or other multiphase full bridges (not shown).)

Stacked half bridge networks 70 are shown in FIG. 7 and include the ring networks 60 of FIG. 6. A ground ring or several ground rings (not shown) can be added near V+ and V− for decoupling and shielding. In another embodiment (FIG. 8), half-bridge networks 60', 60", 60''' are stacked e.g. vertically. Here, only V+ and V− busses 20', 20" may be required, but a ground ring 18 or several ground rings can be added near V+ and V− for decoupling and shielding. The half bridges are connected to respective coaxial center post tubes 12,112,212. These structures can be 3 phase full bridges or other multiphase full bridges.

A housing arrangement 90 (FIG. 9) for the structures described above comprises a vented grounded cylinder or screen 91 surrounding the circuits 80 to reduce EMI and RFI electrical noise, and to allow coolant flow through the screen 91 surrounding the electrical assemblies. The screen 91 also serves as a safety cover for the devices, protecting from high voltage. All busses (outputs, V+, V−, ground) interface the housing 91 through coaxial cables or coaxially arranged leads 92. In three-phase systems, output comes out as triax or quadax leads. Ground plates 93 are provided for mounting filters (not shown) on the top and bottom of the assembly 90 within the ground screen 91.

In the modular ring networks described, connections to the vertical posts (20, 20', 20", 22) can be made by simple mechanical clamps, allowing modules to be easily swapped out for servicing. Vertical voltage busses 20, 20' and 20" and the central output bus 12 can be rods, cables or tubes carrying current. The busses can be designed to carry not only current but also coolant. For ultra efficiency, the busses can contain superconductors for operation at cryogenic temperatures. The power electronics components can also be cryogenically cooled for improved performance.

Although the figures illustrate constructions including 8 switches symmetrically arranged, it should be understood that the number of components (switches, capacitors, busses, etc.) is not limited to the illustrated quantities. Requirements are for matched components and symmetry in arrangement about a common central terminal e.g. output bus 12. Thus, the quantity N of matched switches S, for example, may be any amount from 2, 3, 4 . . . n, which are positioned about the central terminal with symmetry.

Additionally, the ground and voltage rings are illustrated as circular (which conforms to popular dictionary definitions of "ring"). This is a preferred construction when considering the objective of symmetry. But, other constructions can provide physical symmetry. For example, the 8-spoked construction in FIG. 2 can have ground or voltage "rings" that are octagons, which provide physical symmetry. However, considering current-field interactions and their complexities, the electrical symmetry at the apices of a polygon is less than for a circle, when considering an objective of equivalent characteristics for every portion of the "ring". Nevertheless, all physically symmetric constructions of the voltage (input and output) and ground "rings", some electrically superior to other shapes, shall be considered to fall within the inventive scope of this application and its claims.

Figure 2:
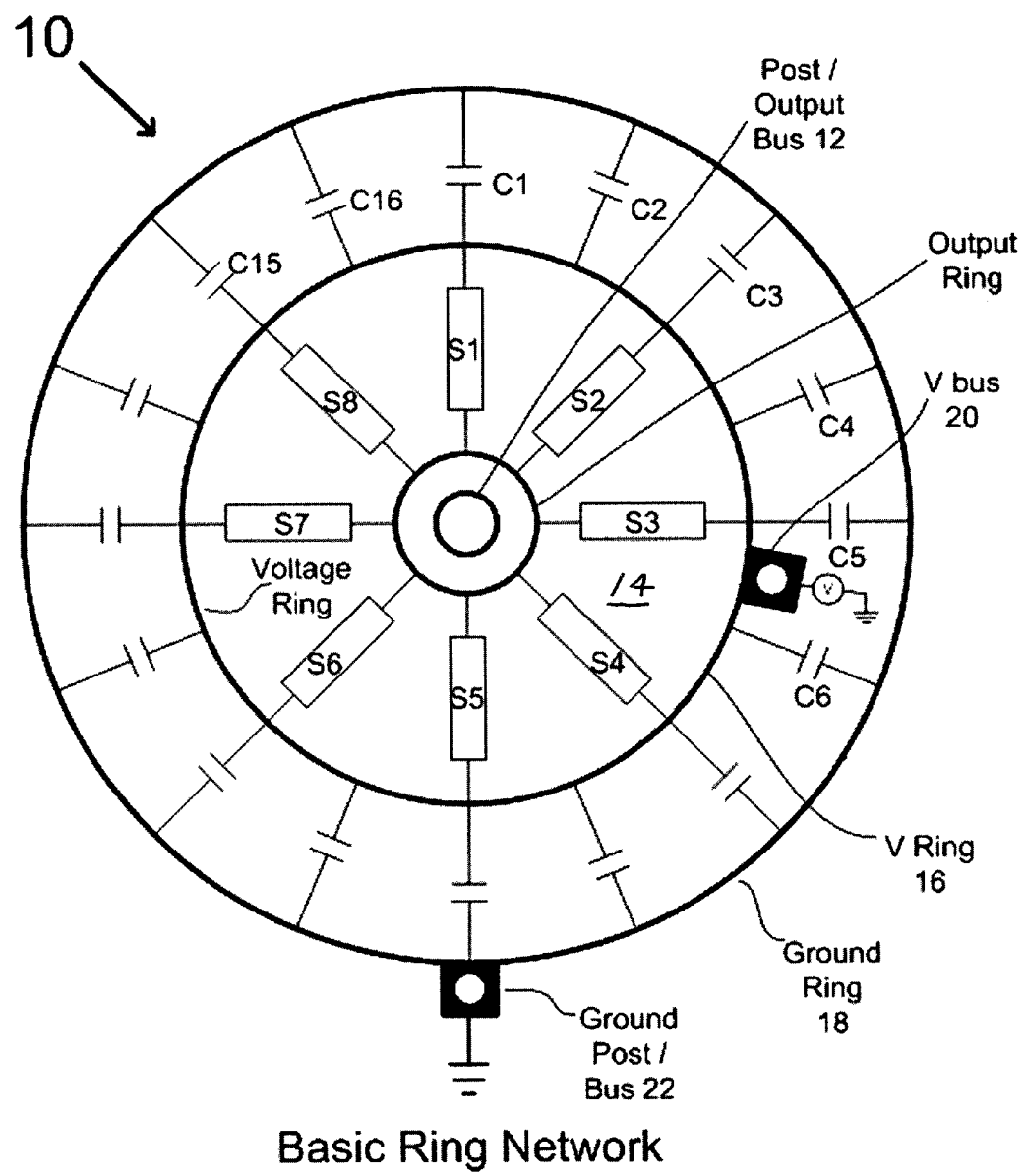
FIG. 2 is an electrical schematic of the basic ring network in accordance with the invention.

Also, it should be understood that in a construction of a switch ring network, for example FIG. 2, to pass a current I amperes through N matched switches S, each individual switch may be selected with a rating to carry the entire I amperes (although in a perfectly matched network of switches, each switch will carry I/N amperes). On the other hand, each switch may be rated to carry I/N amperes, or any selected rating between I and I/N as the installation designer may require or prefer. Further, switches may carry currents exceeding their ratings when, for example, duty cycles, ambient conditions, etc., permit.

There are several advantages to the topologies in accordance with the invention:
1) Switch parasitic inductance is reduced substantially.
2) The circuits are scalable to high powers and currents by adding more ring networks.
3) The symmetric arrangement of equivalent matched switches, capacitors, control circuits, etc. leads to a more balanced circuit, reducing switch timing skews and avoiding current hogging by a single switch.
4) The symmetric arrangement of decoupling capacitance helps balance the voltage feeds.
5) The ring topology is compatible with cryogenic containers.
6) The ring topology accommodates very high speed circuits extending to RF.

What is claimed is:

1. A circuit topology of a first ring network, comprising:
a central conductor;
at least one voltage ring that symmetrically surrounds said central conductor;
a plurality of switches symmetrically positioned about said central conductor, each said switch having an input and an output, said inputs being respectively connected to one of said at least one voltage ring, and said outputs being connected to said central conductor,
in operation, current entering said first ring network from said at least one voltage ring, said current flowing from said at least one voltage ring through said plurality of switches in parallel, said switches delivering their currents to said central conductor, and said current leaving said first ring network by flowing through said central conductor.

2. A circuit topology as in claim 1, wherein said at least one voltage ring is one of circular and non-circular.

3. A circuit topology as in claim 1, further comprising a ground ring symmetrically positioned relative to said at least one voltage ring and said central conductor, and a plurality of capacitors connected electrically between said at least one voltage ring and said ground ring.

4. A circuit topology as in claim 3, wherein a common imaginary first plane passes through said switches, said at least one voltage ring, said central conductor, and said capacitors.

5. A circuit topology as in claim 3, wherein said switches and capacitors are distributed spoke-like around said central conductor, and further comprising radially oriented electrical inter-connectors between said switches and said central conductor and said at least one voltage ring, and between said capacitors and said at least one voltage ring and said ground ring.

6. A circuit topology as in claim 1, wherein at least one said voltage ring is superconductive.

7. A circuit topology as in claim 5, wherein said radial inter-connectors are superconductors.

8. A circuit topology as in claim 3, wherein each said switch is matched in performance characteristics to every other switch performing a same first function, and each said capacitor is matched in performance characteristics to every other capacitor performing a same second function.

9. A circuit topology as in claim 1, wherein said switches are solid state.

10. A circuit topology as in claim 9, wherein at least one said switch is operated at cryogenic temperature.

11. A circuit topology of a first ring network, comprising:
a central conductor;
at least one voltage ring that symmetrically surrounds said central conductor;
a plurality of switches symmetrically positioned about said central conductor in an imaginary first plane, each said switch having an input and an output, said inputs being respectively connected to one of said at least one voltage ring, and said outputs being connected to said central conductor,
in operation, current entering said first ring network from said at least one voltage ring, said current flowing from said at least one voltage ring through said plurality of switches in parallel, said switches delivering their currents to said central conductor, and said current leaving said first ring network by flowing in said central conductor, and further comprising:
a second ring network similar to said first ring network, said second ring network being in an imaginary second plane, said first and second planes being parallel to each other;
a voltage bus transverse to said planes connecting said voltage rings of said first and second ring networks together;
a ground bus transverse to said planes connecting said ground rings of said first and second ring networks together, forming a stack of said ring networks.

12. A circuit topology as in claim 11, wherein said central conductors connect to a common output bus.

13. A circuit topology as in claim 11, wherein said central conductors connect to respective output buses.

14. A circuit topology as in claim 13, wherein said output buses are concentric.

15. A circuit topology as in claim 1, wherein the quantity of said voltage rings is at least two, said inputs to said switches being alternately connected around said ring network to a first and second voltage ring of said at least two voltage rings, said ring network being operable in a half bridge rectifier circuit.

16. A circuit topology as in claim 1, wherein said switches are connected in pairs, said pairs being symmetrically distributed around said ring network.

17. A method of constructing and operating a first ring network, comprising the steps of:
a) providing a central conductor, at least one symmetrical voltage ring, and a plurality of switches matched in physical and electrical characteristics, each said switch having an input and an output;
b) symmetrically positioning said plurality of switches about said central conductor;
c) connecting said switch inputs respectively to one of said at least one voltage ring;
d 1) connecting said switch outputs to said central conductor;
d 2) flowing a current from said at least one symmetrical voltage ring to said switch inputs and through said plurality of switches in parallel, delivering said current from said switches to said central conductor, said current leaving said first ring network from said central conductor.

18. A method as in claim 17, further comprising the steps:
e) providing a symmetrical ground ring and a plurality of matched capacitors;
f) symmetrically positioning said ground ring and said capacitors around said central conductor
g) connecting said capacitors electrically between said at least one voltage ring and said ground ring.

19. A method of constructing a first ring network, comprising the steps of:
a) providing a central conductor, at least one symmetrical voltage ring, and a plurality of switches matched in physical and electrical characteristics, each said switch having an input and an output;
b) symmetrically positioning said plurality of switches about said central conductor;
c) connecting said switch inputs respectively to one of said at least one voltage ring;
d) connecting said switch outputs to said central conductor;
e) providing a symmetrical ground ring and a plurality of matched capacitors;
f) symmetrically positioning said ground ring and said capacitors around said central conductor;
g) connecting said capacitors electrically between said at least one voltage ring and said ground ring; and
further comprising the steps:
h) providing a second ring network including a central conductor, voltage ring, and ground ring similar to said first ring network;
i) stacking said first and second ring networks adjacent each other;
j) electrically connecting said ground rings of said first and second ring networks together;
k) electrically connecting said central conductors of said first and second ring networks together;
l) electrically connecting said at least one voltage ring of said first and second ring networks respectively together.

* * * * *